(12) United States Patent
Gur et al.

(10) Patent No.: US 11,256,494 B2
(45) Date of Patent: Feb. 22, 2022

(54) ECU AND PERIPHERALS UPDATE USING CENTRAL DISPATCH UNIT

(71) Applicant: Red Bend Ltd., Hod-HaSharon (IL)

(72) Inventors: Eli Gur, Binyamina (IL); Sagi Ben Akiva, Tel-Aviv (IL)

(73) Assignee: Red Bend Ltd., Hod-HaSharon (IL)

( * ) Notice: Subject to any disclaimer, the term of this patent is extended or adjusted under 35 U.S.C. 154(b) by 104 days.

(21) Appl. No.: 15/723,051

(22) Filed: Oct. 2, 2017

(65) Prior Publication Data

US 2019/0102159 A1    Apr. 4, 2019

(51) Int. Cl.
    *G06F 8/65*     (2018.01)
    *G06F 13/42*    (2006.01)
    *H04L 29/08*    (2006.01)
    *H04L 67/00*    (2022.01)

(52) U.S. Cl.
    CPC ............ *G06F 8/65* (2013.01); *G06F 13/4278* (2013.01); *H04L 67/34* (2013.01)

(58) Field of Classification Search
    CPC ..... G06F 8/61; G06F 8/65; G06F 8/60; G06F 8/62; G06F 13/4278; H04L 67/34
    See application file for complete search history.

(56) References Cited

U.S. PATENT DOCUMENTS

| | | | | |
|---|---|---|---|---|
| 9,524,158 B2* | 12/2016 | Li | ..................... | H04W 8/205 |
| 9,678,732 B2* | 6/2017 | Thevar | ................ | G06F 21/575 |
| 2002/0112162 A1* | 8/2002 | Cocotis | ................ | H04L 63/08 |
| | | | | 713/176 |
| 2005/0025661 A1 | 11/2005 | Habermas | | |
| 2006/0111084 A1 | 5/2006 | Adatrao et al. | | |
| 2008/0301672 A1* | 12/2008 | Rao | ..................... | G06F 8/61 |
| | | | | 717/177 |
| 2011/0225259 A1 | 9/2011 | Quinn et al. | | |
| 2015/0350101 A1* | 12/2015 | Sinha | ................ | G06F 9/00 |
| | | | | 709/226 |

(Continued)

FOREIGN PATENT DOCUMENTS

WO    WO 2004/063899    7/2004

OTHER PUBLICATIONS

Mohammad Khodari et al.; Decentralized Firmware Attestation for In-Vehicle Networks; CPSS; pp. 47-56, retrieved on Oct. 26, 2021 (Year: 2019).*

(Continued)

*Primary Examiner* — S. Sough
*Assistant Examiner* — Cuong V Luu
(74) *Attorney, Agent, or Firm* — McCoy Russell LLP

(57) ABSTRACT

A computer implemented method of updating software of embedded devices connected to a central dispatch device, comprising using one or more processors of a central dispatch device, the processor(s) are adapted for executing a code for obtaining a respective update package for one or more of a plurality of embedded devices which are operatively connected to the central dispatch device via a communication interconnection, transferring a transient update agent to the embedded device(s) and transferring the update package to the embedded device(s), the one or more embedded devices execute the transient update agent to apply the update package in the one or more embedded devices. The one or more embedded devices discard the transient update agent after the update package is applied.

13 Claims, 3 Drawing Sheets

(56) References Cited

U.S. PATENT DOCUMENTS

| | | | |
|---|---|---|---|
| 2016/0218882 A1* | 7/2016 | Wood | H04L 9/3247 |
| 2016/0246583 A1* | 8/2016 | Kolesnik | G06F 16/148 |
| 2016/0246585 A1* | 8/2016 | Li | H04W 8/205 |
| 2019/0034256 A1* | 1/2019 | Fox | G06F 21/57 |
| 2019/0261170 A1* | 8/2019 | Jiang | H04W 12/08 |

OTHER PUBLICATIONS

Hafizah Mansor et al.; Don't Brick Your Car Firmware Confidentiality and Rollback for Vehicles; IEEE; pp. 139-147; retrieved on Oct. 26, 2021 (Year: 2015).*

European Search Report and the European Search Opinion dated Mar. 27, 2018 From the European Patent Office Re. Application No. 17194327.7. (7 Pages).

Communication Pursuant to Article 94(3) EPC dated Mar. 3, 2020 From the European Patent Office Re. Application No. 17194327.7 (5 Pages).

European Patent Office, Communication pursuant to Article 94(3) EPC Issued in Application No. 17194327.7, dated Oct. 13, 2020, Germany, 6 pages.

European Patent Office, Summons to attend oral proceedings pursuant to Rule 115(1) EPC Issued in Application No. 17194327.7, dated Apr. 30, 2021, Germany, 8 pages.

* cited by examiner

ECU AND PERIPHERALS UPDATE USING CENTRAL DISPATCH UNIT

BACKGROUND

Some embodiments described herein relate to providing update packages to embedded devices, and, more specifically, but not exclusively, to providing update packages to embedded devices using a central dispatch unit.

With the constant evolution of modern smart platforms, multiple types of embedded devices are deployed for a plurality of applications, for example, home and office control, vehicle control, agriculture, water industries, industrial applications and many more.

Functionality of such embedded devices is also constantly increasing through software, firmware, middleware and/or the like (e.g. operating system, application(s), etc.) executed by processing resources integrated in the embedded devices. While typically programmed into a persistent memory of the embedded devices, the software, firmware, middleware and/or the like may require updates after the embedded devices are deployed for a plurality of reasons, for example, increase functionality, add features, adapt to new operational conditions, resolve bugs, apply cyber security measures and/or the like.

SUMMARY

According to a first aspect described herein there is provided a computer implemented method of updating software of embedded devices connected to a central dispatch device, comprising using one or more processors of a central dispatch device, the one or more processors are adapted for executing a code, the code is adapted to:
  Obtaining an update package for one or more of a plurality of embedded devices, the one or more embedded devices are operatively connected to the central dispatch device via a communication interconnection.
  Transferring a transient update agent to the one or more embedded devices.
  Transferring the update package to the one or more embedded devices. The one or more embedded devices execute the transient update agent to apply the update package in the one or more embedded devices. The one or more embedded devices discard the transient update agent after the update package is applied.

The embedded devices may typically have limited memory resources, in particular persistent memory resources. As such applying update packages to executable and/or non-executable modules installed in the embedded devices may be limited and in many cases impossible since the embedded devices may not store locally an update agent which may require significant memory resources. Moreover due to the limited memory resources it is desirable to apply differential updates in which only relevant portions and/or segments of the executable and/or non-executable modules are updated. Such differential update may require an enhanced update agent which may naturally require more memory.

Therefore providing the transient update agent to the embedded devices for the update session and the fact that the embedded devices may discard the transient update agent may resolve the insufficient memory resources limitation and allow updating, optionally differentially updating the executable and/or non-executable modules for embedded devices which typically do not have the resources to support such update. Moreover, the systems, platforms and/or infrastructures typically comprise a large number of embedded devices. The update sessions for updating the embedded devices may therefore be significantly simplified by using the central dispatch device.

The central dispatch device may locally conduct the update sessions rather than each of the embedded devices directly accessing the storage resource(s) to check for and/or retrieve its respective update package. Furthermore, the embedded device may take advantage of enhanced software update capabilities provided by the transient update agent, compression to reduce the bandwidth of the communication interconnection required to transfer the update package thus reducing communication load on the communication interconnection.

According to a second aspect described herein there is provided a system for updating software of embedded devices locally connected to a central dispatch device, the code comprising a central dispatch device comprising one or more processors adapted to execute code, the system comprising:
  Code instructions to obtain an update package for one or more of a plurality of embedded devices, the one or more embedded devices are operatively connected to the central dispatch device via a communication interconnection.
  Code instructions to transfer a transient update agent to the one or more embedded devices.
  Code instructions to transfer the update package to the one or more embedded devices, the one or more embedded devices execute the transient update agent to apply the update package in the one or more embedded devices. The one or more embedded devices discard the transient update agent after the update package is applied.

In a further implementation form of the first and/or second aspects, a topology of the communication interconnection is a member of a group consisting of: a network, a bus and a point-to-point connection. This allows adapting and utilizing the update method in systems and/or platforms employing various interconnection, bus and/or network topologies.

In a further implementation form of the first and/or second aspects, the embedded devices connected to the central dispatch device are deployed in a vehicle. The number of embedded devices deployed in modern vehicles may be extremely high and constantly rising. Using the central dispatch device to provide the update package(s) to vehicle deployed embedded devices may therefore be of particular interest.

In a further implementation form of the first and/or second aspects, the update package is a member of a group consisting of: a full version update and a differential update. This allows adapting and utilizing the update method according to the update capabilities of various embedded devices as well as to the memory resources available to various embedded devices.

In a further implementation form of the first and/or second aspects, the one or more processors obtain the update package from a local storage resource attached to one or more Input/Output (I/O) interfaces of the central dispatch device. This may allow providing the update package(s) through a local resource, for example, an internal persistent memory, an attachable memory device (e.g. memory stick, etc.), a wireless interface and/or the like.

In a further implementation form of the first and/or second aspects, the one or more processors obtain the update package from a remote storage resource accessible from the central dispatch device through a communication interface isolated from the plurality of embedded devices. The vendor(s) of the update package(s) may maintain, revise, update and/or enhance the update package, for example, support additional embedded devices, alter functionality, add or remove and/or alter features and/or the like.

The new update package may be stored in a certain memory resource accessible to the central dispatch device such that the central dispatch device may have the most up to date version of the update package(s). Moreover, in order to increase their security, the embedded devices may be isolated from any external devices thus minimizing the risk for being compromised. The central dispatch device may be the only device capable and/or allowed to communicate with the external devices. The central dispatch device which may typically be a more enhanced device having increased resources may employ one or more measures to protect against potential cyber-attacks, for example, security measures, origin authentication, encryption and/or the like.

In an optional implementation form of the first and/or second aspects, the remote storage resource includes a shared repository storing a plurality of update packages for at least some of the plurality of embedded devices, each of the plurality of update packages is provided by a respective vendor. Using the shared repository for storing the update packages may allow the vendors to update their respective update packages independently of the other vendors and/or other update packages such that when the central dispatch device accesses the shared repository it may retrieve the most up to date version of the update packages.

In a further implementation form of the first and/or second aspects, the transient update agent is configured for execution by multiple embedded devices of the plurality of embedded devices. Using a single version of the transient update agent for multiple embedded devices may significantly reduce the complexity of the update sessions as well as the memory and/or communication resources required for the central dispatch agent to store and/or obtain respectively the transient update agent.

In a further implementation form of the first and/or second aspects, the transient update agent is locally available in the central dispatch device from a local storage. This may allow providing the transient update agent through a local resource, for example, an internal persistent memory, an attachable memory device (e.g. memory stick, etc.) and/or the like.

In a further implementation form of the first and/or second aspects, the one or more processors obtain the transient update agent from a remote storage resource accessible from the central dispatch device through a communication interface isolated from the plurality of embedded devices. The vendor(s) of the transient update agent transient update agent may maintain, revise, update and/or enhance the transient update agent, for example, support additional embedded devices, alter functionality, add or remove and/or alter features and/or the like. The new transient update agent may be stored in a certain memory resource, in particular a shared repository accessible to the central dispatch device such that the central dispatch device may have the most up to date version of the transient update agent.

In a further implementation form of the first and/or second aspects, the transferring comprises mapping of the transient update agent and/or the update package to a memory resource accessible to the one or more embedded devices. This allows adapting and utilizing the update method in systems and/or platforms employing a bus and/or network topology in which memory resources may be mapped across the bus and/or network to one or more embedded devices residing on the bus and/or network. In addition, using the external mapped memory resource may reduce the internal memory resources needed at the embedded devices to perform the update session, for example, for executing and/or storing the transient update agent and/or the update package.

In a further implementation form of the first and/or second aspects, the transferring comprises communicating with the one or more embedded devices to transfer the transient update agent and/or the update package to the one or more embedded devices. This allows adapting and utilizing the update method in systems and/or platforms employing direct interconnection and/or network topology in which the central dispatch device communicates with the embedded devices over the direct interconnection and/or network.

In an optional implementation form of the first and/or second aspects, validity of the transient update agent and/or the update package is authenticated. Authenticating the transient update agent and/or the update package may significantly improve security and/or immunity of the embedded devices to potential malicious cyber-attacks which may be initiated through compromised transient update agents and/or update packages.

In an optional implementation form of the first and/or second aspects, an authentication session is initiated between the central dispatch device and the one or more embedded devices to authenticate the central dispatch device and/or the embedded device(s). As the embedded devices may authenticate the identity of the originating central dispatch device, the security and/or immunity of the embedded devices to potentially malicious cyber-attacks may be further improved. Also the central dispatch device may authenticate the identity of the embedded devices thus avoiding transferring the transient update agent and/or the update package to an invalid and potentially malicious device which may exploit and/or compromise the received transient update agent and/or the update package.

In an optional implementation form of the first and/or second aspects, the transient update agent and/or the update package are encrypted. Encrypting the transient update agent and/or the update package may further improve security and/or immunity of the embedded devices to potential malicious cyber-attacks which may be initiated through compromised transient update agents and/or update packages.

Unless otherwise defined, all technical and/or scientific terms used herein have the same meaning as commonly understood by one of ordinary skill in the art to which the embodiments described herein pertain. Although methods and materials similar or equivalent to those described herein can be used in the practice or testing of embodiments described herein, exemplary methods and/or materials are described below. In case of conflict, the patent specification, including definitions, will control. In addition, the materials, methods, and examples are illustrative only and are not intended to be necessarily limiting.

Implementation of the method and/or system of embodiments described herein can involve performing or completing selected tasks manually, automatically, or a combination thereof. Moreover, according to actual instrumentation and equipment of embodiments of the method and/or system described herein, several selected tasks could be implemented by hardware, by software or by firmware or by a combination thereof using an operating system.

For example, hardware for performing selected tasks according to embodiments described herein could be implemented as a chip or a circuit. As software, selected tasks according to embodiments described herein could be implemented as a plurality of software instructions being executed by a computer using any suitable operating system. In an exemplary embodiment described herein, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF SEVERAL VIEWS OF THE DRAWINGS

Some embodiments are herein described, by way of example only, with reference to the accompanying drawings. With specific reference now to the drawings in detail, it is stressed that the particulars shown are by way of example and for purposes of illustrative discussion of embodiments described herein. In this regard, the description taken with the drawings makes apparent to those skilled in the art how embodiments described herein may be practiced.

In the drawings.

DETAILED DESCRIPTION

Figure 1:
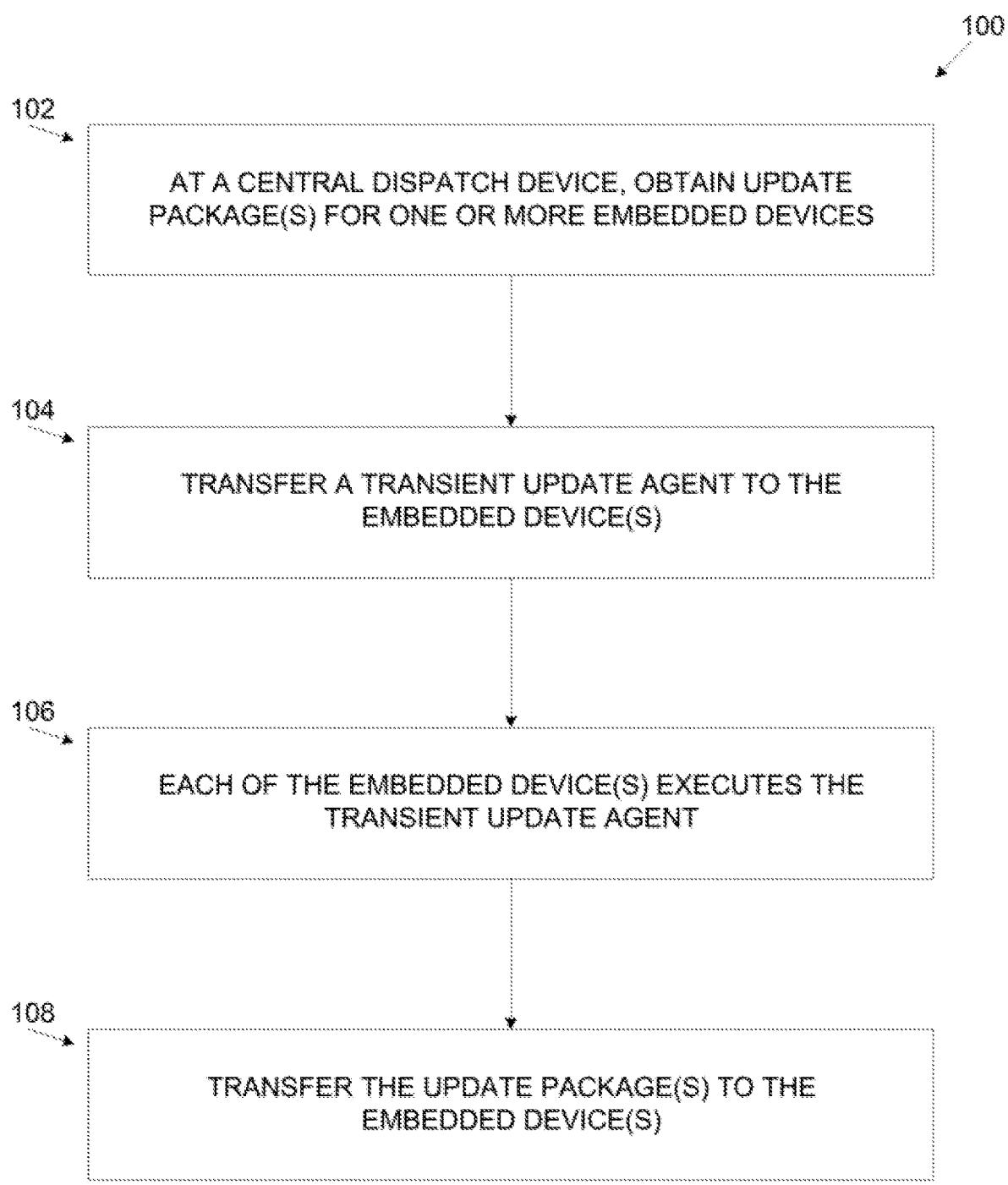
FIG. 1 is a flowchart of an exemplary process of using a central dispatch device to provide update packages to embedded devices, according to some embodiments described herein.

Some embodiments described herein relate to providing update packages to embedded devices, and, more specifically, but not exclusively, to providing update packages to embedded devices using a central dispatch unit.

According to some embodiments described herein, there are provided methods, systems and computer program products for using a central dispatch device to transfer update packages to a plurality of embedded devices, specifically locally deployed embedded devices operatively connected to the central dispatch device via a communication interconnection. In order to overcome memory resources limitations of the embedded devices which may limit and/or prevent updating executable and/or non-executable modules of the embedded devices, during each update session the central dispatch device may transfer and/or provide a transient update agent to the embedded devices thus relieving the embedded devices from locally storing a permanent copy of the update agent.

The embedded device may execute the transient update agent to obtain the update package in particular a differential update package for updating one or more of the executable and/or non-executable module(s) of the embedded device and apply the update to the embedded device. After the update session is complete and the update package is applied in the embedded device, the embedded device may discard (i.e. remove, delete and/or dump) the transient update agent to release its limited memory resources for loading and/or executing operational executable and/or non-executable module(s).

The embedded devices, for example, vehicle deployed Electrical Control Units (ECU), IoT devices, sensors, meters, road infrastructure elements, agricultural control devices, industrial control devices, building infrastructure elements, mobile devices and/or the like may comprise one or more processors (e.g. a microprocessor, a microcontroller, etc.) executing one or more of the executable modules, for example, software, firmware, middleware and/or the like (e.g. operating system, application(s), agent(s), script(s), etc.) to control functionality of the respective embedded device. One or more of the embedded devices may further use one or more non-executable data modules, for example, map data, calibration information and/or the like.

It may be desirable to update the executable and/or non-executable modules of the embedded devices one or more times during the lifetime of the embedded devices after deployed.

Updating the executable and/or non-executable modules may be required for one or more reasons, for example, increase functionality, add features, adapt to new operational conditions, resolve bugs, apply cyber security measures and/or the like. However supporting such update capability may present some major challenges, in particular in cases where the embedded devices are low end, low cost devices having limited resources, specifically limited memory resources (e.g. persistent memory, volatile memory, etc.), limited communication resources and/or the like.

Some currently existing update methods, for example, Unified Diagnostic Services (UDS) targeting vehicle deployed embedded devices as well as other existing methods may support full version updates, in particular naïve software updates in which an entire memory image of the embedded device is updated (flashing the entire memory image). However, such naïve update may require significant memory resources and/or communication bandwidth thus making the update session inefficient and/or impossible for the resources limited embedded devices. For example, a vehicle may be deployed with an extremely large number of embedded devices, typically over a 100 ECUs. Applying the naïve update session for updating such a large number of ECUs may consume significant communication bandwidth.

As part of their inherent operation and application, the embedded devices typically support communication connectivity to the communication interconnection of their higher level system, platform and/or infrastructure. The central dispatch device may therefore be easily integrated into the system, platform and/or infrastructure such that the embedded devices are connected to the central dispatch device through the communication interconnection which may include one or more wired and/or wireless interconnections, for example, a network, a bus, a point-to-point connection and/or the like. Each of the interconnections may be dedicated to a single embedded device (i.e. point-to-point) and/or shared by multiple embedded devices (network, bus) connecting to the central dispatch device. The communication interconnection may include, for example, a Controller Area Network (CAN) bus, a Wireless Local Area Network (LAN) (e.g. Wi-Fi), a Bluetooth Low Energy (BLE) network, a serial bus and/or the like.

The central dispatch device may typically have increased internal resources compared to the embedded devices, for example, increased memory capacity, increased communication capabilities, increased processing power and/or the like. As such the central dispatch device may obtain update packages for the embedded devices from one or more storage resources, for example, local storage (internal persistent memory, disk drive, etc.), attachable storage resources (memory card, memory stick, etc.) and/or remote storage resources (server, service, cloud etc.) accessible over one or more networks available to the central dispatch device.

Due to their limited memory and/or communication (bandwidth) resources, applying differential update to the embedded devices may be more efficient. The differential update consists of updating only relevant segments(s) of executable and/or non-executable module(s) already installed on the embedded device rather than updating (flashing) the entire memory image. While the differential update may significantly reduce the required memory and/or communication resources, such differential update may require enhanced update capabilities, for example, identifying segment(s), deleting, backing-up, copying and integrating the segment(s), verifying the integration and more. The enhanced update capabilities may be supported by the update agent. However, the update agent may itself require some part of the limited memory resources available to the embedded devices thus the update agent may not be locally (and permanently) stored at the embedded devices or degraded update agent version may be used at best.

To overcome the limitations of the embedded devices, the central dispatch device may provide the transient update agent to the embedded devices rather than having each of the embedded devices locally storing a permanent copy of the update agent. The embedded devices may execute the transient update agent for applying the update package(s) and discard (i.e. remove, delete and/or dump) the transient update agent after applying the update package(s) to the embedded device. The central dispatch device may have the update agent locally available (e.g. stored in a local storage device) or the central dispatch device may access one or more local and/or remote external storage resources to obtain the update agent.

Optionally, while there may be several versions of the transient update agent configured for different types and/or variants of the embedded devices, the transient update agent may be designed, constructed and/or configured to be oblivious (agnostic) of the embedded device executing and using it. Therefore, a single and/or similar version of the transient update agent may be provided by the central dispatch device to multiple embedded devices of various types, variants and/or vendors.

After receiving the transient update agent from the central dispatch device, each of the target embedded devices may execute the transient update agent, typically in volatile memory (e.g. RAM) to communicate with the central dispatch device to receive its respective update package. While conducting the update session, operational software and/or data modules may be terminated to release resources of the embedded device, for example, memory resources, processing resources and/or communication resources for the execution of the transient update agent.

Using the transient update agent, the target embedded device(s) may apply the received update package. Once the update package is applied, the embedded device may discard, for example, remove, delete and/or dump the transient update agent to free its memory resources for its operational executable and/or non-executable modules.

Optionally, the transient update agent supports additional enhanced update capabilities, for example, decompression, encryption, authentication and more. Such enhanced update capabilities may naturally increase the memory footprint (size) of the update agent and further reducing feasibility of storing such an enhanced update agent in the embedded device(s)'s limited memory resources.

The central dispatch device may provide the transient update agent and/or the update package to the target embedded device(s) through a communication session transfer and/or by mapping the transient update agent and/or the update package to a memory resource, for example, a RAM array, a Flash array and/or the like accessible to the embedded device(s) via the communication interconnection.

Optionally, the central dispatch device communicates with one or more of the embedded devices to identify one or more attributes of the target embedded device(s), for example, a type, a variant, a vendor, a (current) version, a memory resource capacity and/or the like. The central dispatch device may then select the appropriate transient update agent and/or software update(s) according to the identified attributes of the target embedded device(s).

Optionally, the central dispatch device authenticates an origin and/or contents of the transient update agent and/or the update package before providing them to the embedded device(s).

Optionally, a unified update package includes both the update package and the transient update agent.

Optionally, the central dispatch device simultaneously provides the transient update agent(s) and/or the update package(s) to multiple target embedded devices.

Using the central dispatch device to provide update packages to the embedded devices may present significant advantages.

First, the memory resources of the embedded devices, in particular persistent memory resources may be significantly reduced which may in turn significantly reduce cost and/or complexity of the embedded devices. The memory resources reduction may be feasible due to the ability to apply the update package, specifically the differential update package using the transient update agent that is not locally stored at the embedded devices. In addition, applying delta updates which may be supported by the transient update agent may significantly reduce the communication bandwidth required to transmit the update package(s) to the embedded device(s). Also, by providing the transient update agent, the vendor(s) of the embedded device(s) may be relieve from the need to pre-integrate a copy of the update agent into the embedded device(s).

Moreover, since typically the systems, platforms and/or infrastructures comprise a large number of embedded devices, the update sessions for updating the embedded devices may be significantly simplified by using the central dispatch device. The central dispatch device may locally conduct the update sessions rather than each of the embedded devices directly accessing the storage resource(s) to check for and/or retrieve its respective update package. Moreover, the central dispatch device which is typically a higher resources device may take further actions while obtaining the update packages from the storage resource(s), for example, authenticate the origin and/or content of the update packages. In addition, in case the update agent itself needs to be updated and/or replaced with another version, updating the transient update agent may be done once at the central dispatch device rather than at each of the embedded devices as may be required when each of the embedded devices stores a local copy of the update agent.

Furthermore, the embedded device may take advantage of the enhanced update capabilities provided by the transient update agent. For example, the update package provided by the central dispatch device may be compressed to reduce the bandwidth of the communication interconnection required to transfer the update package thus reducing communication load on the communication interconnection. Once received by the embedded device, the embedded device executing the transient update agent may decompress the update package optionally in segments to further reduce the memory resources required at the embedded devices. Also, the update package may be encrypted and/or authenticated to verify the origin and/or content of the update package thus increasing security and/or immunity of the embedded devices to malicious cyber-attacks.

In addition, using a single version of the transient update agent for multiple embedded devices may significantly reduce the complexity of the update sessions as well as the memory and/or communication resources required for the central dispatch agent to store and/or obtain respectively the transient update agent.

Before explaining at least one embodiment in detail, it is to be understood that the embodiment described herein are not necessarily limited in its application to the details of construction and the arrangement of the components and/or methods set forth in the following description and/or illustrated in the drawings and/or the Examples. The embodiments described herein are capable of other embodiments or of being practiced or carried out in various ways.

The embodiments described herein may be a system, a method, and/or a computer program product. The computer program product may include a computer readable storage medium (or media) having computer readable program instructions thereon for causing a processor to carry out aspects described herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations described herein may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects described herein.

Aspects and/or embodiments described herein may be described with reference to flowchart illustrations and/or block diagrams of methods, apparatus (systems), and computer program products according to embodiments described herein. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments described herein. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 is a flowchart of an exemplary process of using a central dispatch device to provide update packages to embedded devices, according to some embodiments described herein. An exemplary process 100 may be executed by one or more processors of a central dispatch device to provide update packages to a plurality of embedded devices operatively connected to the central dispatch device through one or more communication interconnections, for example, a network, a bus, a point-to-point connection and/or the like.

The central dispatch device, for example, an embedded device, a server, a network node and/or the like may obtain one or more update packages for updating one or more executable and/or non-executable modules of one or more target embedded devices planned to be updated. The central dispatch device may obtain the update package, either a full version update and/or a differential update from one or more local and/or remote storage resources. Optionally, the storage resources utilize a repository, for example, a database, a service, an application and/or the like.

The central dispatch device first provides the target embedded device(s) with a transient update agent that may be executed by the embedded device(s) to communicate with the central dispatch device to receive the update package and apply it to their respective embedded device(s).

Figure 2A:
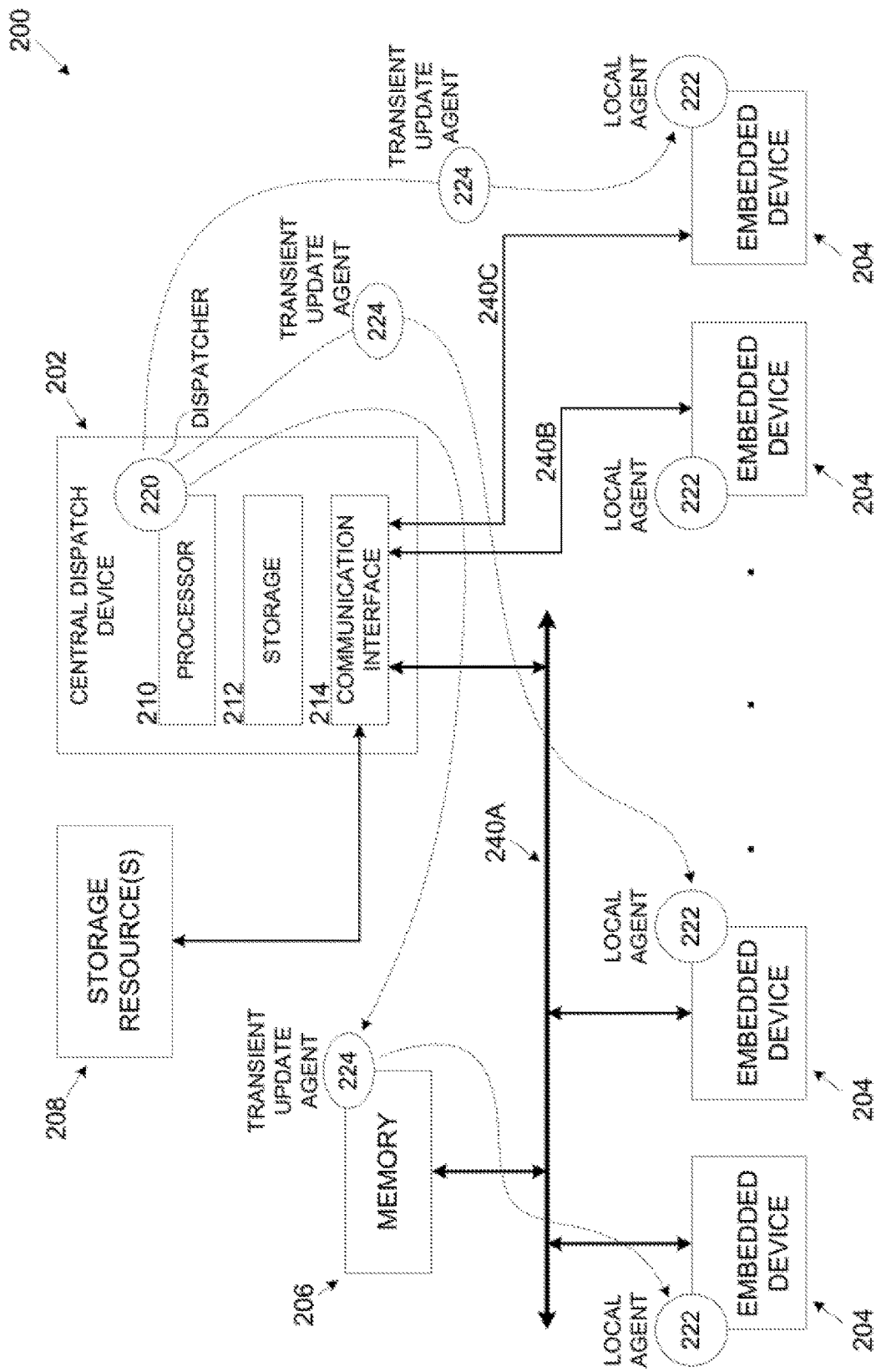
FIG. 2A and FIG. 2B are schematic illustrations of an exemplary system for using a central dispatch device to provide update packages to embedded devices, according to some embodiments described herein.
Figure 2B:
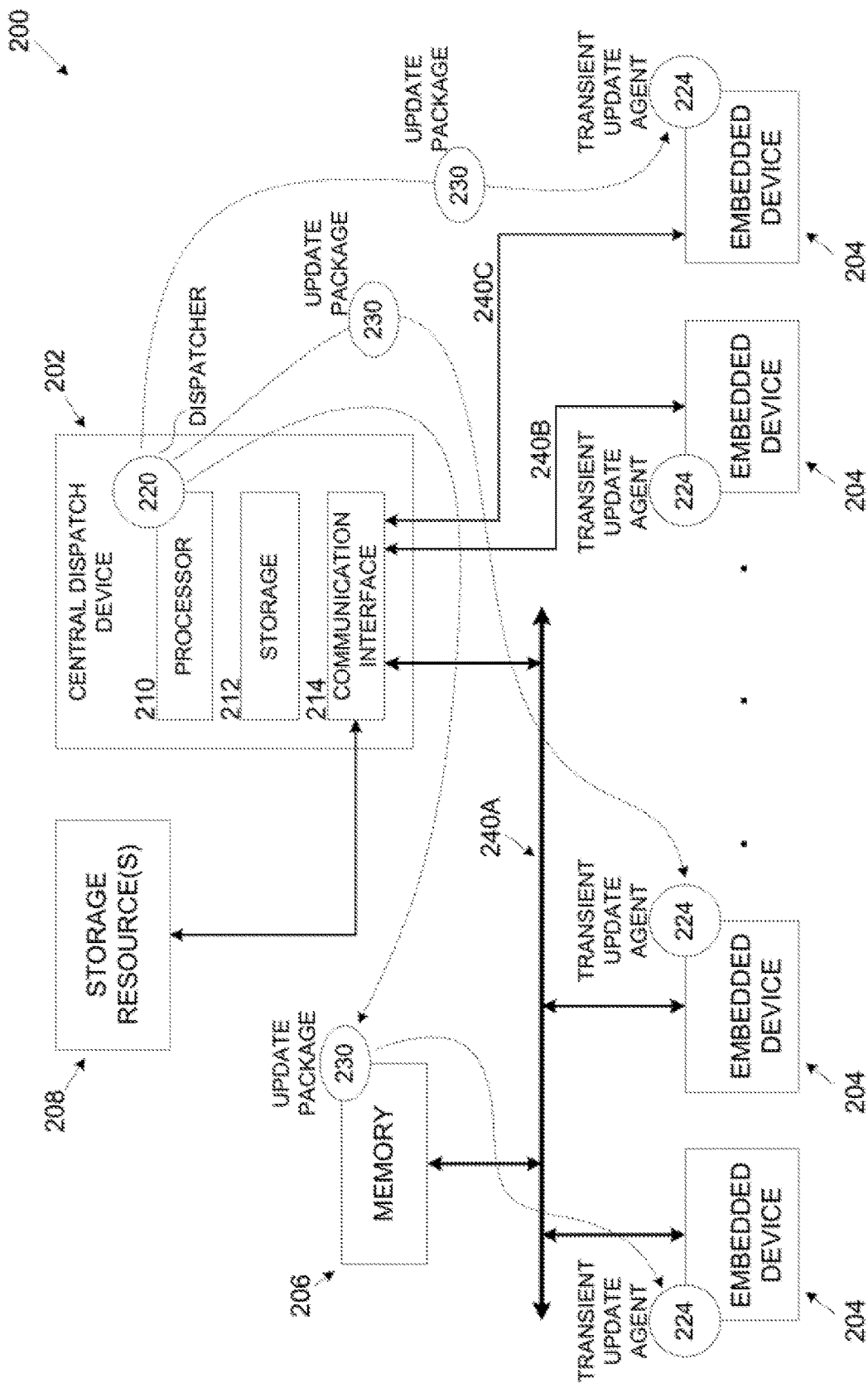

Reference is also made to FIG. 2A and FIG. 2B, which are schematic illustrations of an exemplary system for using a central dispatch device to provide update packages to embedded devices, according to some embodiments described herein. An exemplary system 200 for executing a process such as the process 100 includes a central dispatch device 202 which may provide one or more update packages 230 to a plurality of embedded devices 204 operatively connected to the central dispatch device 202.

The embedded devices 204 connect to the central dispatch device 202 via a communication interconnection 240 comprising one or more wired and/or wireless interconnections, for example, a network (e.g. LAN, Wireless LAN, BLE, RF, cellular, etc.), a bus (e.g. CAN bus, ARINC, multi-drop serial bus etc.) and/or point-to-point interconnection (e.g. serial bus, USB, etc.). One or more of the embedded devices 204 may be connected to the central dispatch device 202 through a dedicated interconnection (e.g. the USB link, etc.), for example, a dedicated interconnection 240B and/or 240C each connecting a single embedded device 204 to the central dispatch device 202. Additionally and/or alternatively, multiple embedded devices 204 may connect to the central dispatch device 202 via a common (shared) network and/or bus, for example, a bus 240A. In such deployment, each of the embedded devices 204 operatively connected to the bus 240A may be identified by a unique identifier (ID), for example, an address, an ID tag, a numeric value and/or the like.

The central dispatch device 202, for example, a central embedded device, a server, a network node and/or the like includes a processor 210, a storage 212 and a communication interface 214. The processor 210, homogenous or heterogeneous, may include one or more processors arranged for parallel processing, as clusters and/or as one or more multi core processor(s).

The storage 212 may include one or more non-transitory persistent storage devices, for example, a hard drive, a Flash array and/or the like. The storage 212 may further include one or more attachable storage devices, in particular persistent storage devices, for example, an attachable hard drive, a memory stick and/or the like. The storage 212 may also include one or more volatile devices, for example, a Random Access Memory (RAM) component and/or the like.

The communication interface 214 may include one or more wireless communication interfaces, in particular communication interfaces supporting the communication interconnection for connecting to the embedded devices 204, for example, a LAN interface, a Wireless LAN interface, a BLE interface, an RF interface, a CAN bus interface, an ARINC interface, a serial bus interface, a USB interface and/or the like. The communication interface 214 may further include one or more additional interfaces to connect to one or more storage resources 208, local and/or remote to obtain the update packages 230. These additional interfaces may typically be isolated and/or independent of the communication interconnection connecting to the embedded devices 204 to the central dispatch device 202.

The storage 212 may be used to store data as well as one or more software modules, for example, an OS, an application, a tool, an agent, a service, a script and/or the like each comprising a plurality of program instructions that may be executed by the processor 210 from the storage 212. The processor 210 may execute, for example, a dispatcher 220 for providing the update packages 230 to the embedded devices 204.

The embedded devices 204 may be processing devices comprising one or more processors, for example, a microprocessor, a microcontroller, and/or the like executing one or more executable modules, for example, software, firmware, middleware and/or the like (e.g. operating system, application(s), agent(s), tool(s), script(s), etc.) to control functionality of the respective embedded device 204. One or more of the embedded devices 204 may further use one or more non-executable modules, in particular non-executable data modules, for example, map data, calibration information and/or the like. The embedded devices 204 may include, for example, an IoT device, a sensor, a smart meter, a road infrastructure element, an agricultural control element, an industrial control element and/or the like. The embedded devices 204 may also include vehicle deployed embedded devices, which may be attached, installed and/or integrated in one or more vehicles, for example, an Electric Control Unit (ECU) controlling one of more vehicle systems (e.g. a door lock, a window lift system, an engine control system, a transmission control system, a breaking system, an infotainment system, a navigation system, etc.), an imaging sensor and/or the like. In some embodiments described herein, the embedded devices 204 may include one or more mobile devices, for example, a Smartphone, a tablet, a laptop and/or the like.

Each of the embedded devices 204 may execute a local agent 222 which may communicate with the dispatcher 220 over the communication interconnection to receive a transient update agent 224. Once received, the embedded devices 204 may execute the transient update agent 224 to receive the update package(s) 230 from the dispatcher 220.

As shown at 102, the process 100 starts with the dispatcher 220 obtaining one or more of the update packages 230 for updating one or more of the executable modules, for example, software, firmware, middleware and/or the like (e.g. operating system, application(s), tool(s), agent(s), script(s) etc.) and/or non-executable modules (e.g. map data, calibration information, etc.) of one or more target embedded devices 204 planned to be updated. Each of the update packages 230 may be a full version update (e.g. a new version, a previous version, an updated version, etc.) for a respective embedded device(s) 204 or a differential update to the executable and/or non-executable module(s) already installed in the respective embedded device(s) 204.

Each of the update packages 230 may be configured according to one or more attributes, for example, a type, a variant, a vendor, a (current) version and/or the like of a respective target embedded device 204. For example, a certain update package 230 may be configured to upgrade a plurality of embedded devices 204 of a certain type and/or embedded devices 204 produced by a certain vendor. In another example, a certain update package 230 may be configured to upgrade every embedded device 204 loaded with a certain executable module of a version which precedes a certain version. In another example, a certain embedded device 204 may have multiple variants where each of the variants may have different functionality, features and/or capabilities. In such case, multiple versions of the update package 230 may be created for the certain type of embedded devices 204 where each of the versions may be adapted and/or configured for one or more of the variants.

In another example, multiple versions of a certain update package 230 may be created for the certain type of embedded devices 204 where a size of each of the versions is different to adapt to given storage resources (e.g. persistent memory, volatile memory) available to the certain type of embedded device 204.

The dispatcher 220 may access the storage resource(s) 208 to obtain the update packages 230. The storage resource(s) 208 may include local and/or remote storage resources. The dispatcher 220 may access the remote storage resources, for example, a server, a storage server, a cloud storage, a network service, a cloud service and/or the like over one or more networks, for example, the internet, through one or more of the network interfaces supported by the communication interface 214, for example, the LAN interface, the WAN interface, the MAN interface, the cellular interface and/or the like. The network interfaces used by the dispatcher 220 to access the remote storage resources are typically isolated and independent from the communication interconnection connecting the central dispatch device 202 to the embedded devices 204.

Optionally, the storage resource(s) 208 includes local resources, for example, an attachable disk drive, a memory stick and/or the like which may be accessed by the dispatcher 220 through one or more local interfaces supported by the communication interface 214, for example, the USB interface and/or the like.

The storage resource(s) 208 may be facilitated through a repository, for example, a database, a service, an application and/or the like which may be shared by multiple vendors providing software and/or data modules for the embedded devices 204. For example, whenever a certain update package 230 is available from one of the vendors for one or more of the embedded devices 204, the respective vendor(s) may update the storage resource(s) 208 with the certain update package 230. The vendors may submit update package(s) 230 in the shared repository independently and asynchronously from each other.

Optionally, the dispatcher 220 initiates an authentication session with the remote resources of the storage resource(s) 208 to authenticate the origin (provider) and/or the content of the update package(s) 230. This may be done to increase immunity of the embedded device(s) 204 to cyber-attacks of potential malicious attackers that may be initiated by installing malicious executable modules on the embedded devices 204. The authentication session may be based, for example, on public/private key encryption algorithms.

In some embodiments described herein, one or more attachable storage devices pre-loaded with one or more of the update packages 230, for example, a USB memory device and/or the like may be attached to one or more Input/Output (I/O) interfaces and/or ports supported by the communication interface 214. The dispatcher 220 may access the pre-loaded attachable storage device(s) to obtain the stored update package(s) 230.

Optionally, the dispatcher 220 communicates with one or more of the embedded devices 204 to identify the attributes of the respective embedded device(s) 204. The dispatcher 220 may then access the storage resource(s) 208 to check availability and/or the select an appropriate update package(s) 230 according to the identified attributes of the respective embedded device(s) 204. This communication may be initiated by the dispatcher 220, for example, periodically, on command and/or the like. Additionally and/or alternatively, one or more of the embedded devices 204 may initiate the communication with the dispatcher 220 to trigger the dispatcher 220 to check for available update package(s) 230.

Optionally, one or more of the update packages 230 are encrypted to increase immunity of the update packages 230 to potential malicious interception and/or to improve protection of the embedded devices 204 against malicious cyber-attacks. The encryption may be done using one or more encryption algorithms, for example, public key encryption, private key encryption and/or the like.

Optionally, one or more of the update packages 230 are compressed to reduce the bandwidth of the communication channel between the central dispatch device 202 and the storage resource(s) 208.

The dispatcher 220 may locally store the obtained update package(s) 230, for example, in the storage 212.

As shown at 104 and demonstrated in FIG. 2A, the dispatcher 220 transfers (provides) the transient update agent 224 to one or more of the embedded devices 204 that need to be provided with the update package(s) 230. There may be multiple transient update agents 224 each adapted to one or more of the embedded devices 204 according to their attributes. The dispatcher 220 may therefore select an appropriate transient update agent 224 to be transferred to each of the embedded devices 204.

Providing the transient update agent 224 facilitates the possibility to support the embedded devices 204 enhanced update capabilities, for example, differential update, decompression, encryption, authentication and more, in particular embedded devices 204 having limited resources (e.g. memory resource, communication resources, etc.). The limited memory resources may relate to limited persistent memory, for example, Flash, EEPROM and/or the like and/or to limited volatile memory, for example, RAM. The embedded devices 204 may be therefore limited in the size of memory modules that may be stored and/or executed by the embedded devices 204.

Therefore, in order to avoid the need to locally store the transient update agent 224 which may be a major memory consumer, the embedded device(s) 204 may download the transient update agent 224 temporarily for the update session and optionally discard the transient update agent 224 after applying the update package 230. To receive and initiate the transient update agent 224, the embedded device(s) 204 may execute the local agent 222 stored in the embedded device(s) 204. The local agent 222 may typically be a small footprint software module requiring minimal memory resources and may hence be permanently stored in the persistent memory of the embedded device(s) 204. For example, the local agent 222 may communicate with the dispatcher 220 to download the transient update agent 224 and store it in the volatile memory of the respective embedded device 204.

The local agent 222 may download the transient update agent 224 through a communication session with the dispatcher 220. Optionally, the dispatcher 220 maps, for example, stores, copies and/or the like the transient update agent 224 to a memory 206, for example, a RAM array, a Flash array and/or the like which is accessible to the respective embedded device(s) 204 over the communication interconnection. Once mapped, the local agent 222 of the respective embedded device(s) 204 may retrieve the transient update agent 224 from the memory 206. Mapping the transient update agent 224 in the memory 206 may naturally be implemented in network and/or bus configurations and/or segments of the communication interconnection, for example, the bus 240A.

Optionally, the dispatcher 220 communicates simultaneously with multiple target embedded devices 204 to transfer the transient update agent 224 to them. This may be done assuming the communication interconnection connecting at least some of the target embedded devices 204 supports multiple simultaneous communication sessions and/or message transmission by the dispatcher 220 with the multiple target embedded devices 204. Optionally, simultaneous communication may be conducted in case at least some of the target embedded devices 204 are connected to different independent communication ports supported by the communication interface 214 such that the dispatcher 220 may communicate simultaneously with each of the transient update agents 220 executed by the respective embedded device 204 through its independent communication port.

Optionally, the transient update agent 224 is configured to support multiple devices of the embedded devices 204 such that a single and/or similar version of the transient update agent 224 may be provided (transferred) by the dispatcher 220 to multiple embedded devices 204. However, there may be different variants, versions and/or implementations of the transient update agent 224 that may be configured and/or adapted according to the attributes of one or more of the embedded devices 204. For example, the same transient update agent 224 (i.e. a single version of the transient update agent 224) is used by all the embedded devices 204.

In another example, a certain transient update agent 224 may be implemented for one or more embedded devices 204 of a certain type and/or of a certain vendor. In another example, a certain transient update agent 224 may be configured with a reduced feature thus having a reduced size to a certain footprint allowing the certain transient update agent 224 to be stored and/or used by certain embedded devices 204 having limited memory resources (e.g. RAM). In another example, a certain version of the transient update agent 224 may be implemented for accessing the memory 206 to retrieve the update package 230 while another version of the of the transient update agent 224 may be implemented for communicating with the dispatcher 220 to download the update package 230.

The transient update agent 224 may be locally available to the dispatcher 220 from the storage 212. Optionally, the dispatcher 220 obtains the transient update agent 224 from the storage resource(s) 208 either from local and/or remote resources of the storage resource(s) 208. For example, the dispatcher 220 may obtain the transient update agent 224 by accessing one or more attachable storage devices connected to one or more I/O interfaces supported by the communication interface 214. In another example, the dispatcher 220 may communicate with the remote resource(s) of the storage resource(s) 208, for example, the server, the service, the cloud service to obtain the transient update agent 224. Optionally, the dispatcher 220 initiates an authentication session with the remote resources of the storage resource(s) 208 to authenticate the origin (provider) and/or the content of the transient update agent 224.

Optionally, the transient update agent 224 is encrypted to increase immunity of the transient update agent 224 to potential malicious interception and/or to improve protection of the embedded devices 204 against malicious cyber-attacks. The encryption may be done using one or more encryption algorithms, for example, public key encryption, private key encryption and/or the like. The transient update agent 224 may be encrypted by the vendor(s) of the transient update agent 224 and/or by the dispatcher 220 prior to transferring the transient update agent 224 to the embedded device(s) 204.

As shown at 106 and demonstrated in FIG. 2B, each of the target embedded devices 204 planned to be updated with the respective update package 230 executes the transient update agent 224 previously obtained as described in step 104. Due to their limited persistent memory resources, the embedded device(s) 204 may typically store and execute the transient update agent 224 from their volatile memory. For example, the central dispatch device 202 may transfer the transient update agent 224 to the target embedded device(s) 204 as part of a secondary (alternate) bootloader integrating the transient update agent 224. The target embedded device(s) 204 may then reboot themselves using the secondary bootloader thus executing the transient update agent 224.

In another example, the central dispatch device 202 may issue a command to the target embedded device(s) 204 over the communication interconnection 240 to instruct the target embedded device(s) 204 to restart and/or reboot to execute through a certain channel of the communication interconnection 240 directly mapping the volatile and/or persistent (non-volatile) memory of the target embedded device(s) 204. Since some of the embedded device(s) 204 may be limited also in their volatile memory (e.g. RAM), the embedded device(s) 204 may terminate one or more and optionally all operational software modules and/or non-executable data modules during the update session to release sufficient volatile memory for storing and/or executing the transient update agent 224.

As shown at 108 and demonstrated in FIG. 2B, the dispatcher 220 transfers (provides) the update package 230 to the target embedded device(s) 204. Similarly to providing the transient update agent 224 as described in step 104, the dispatcher 220 may transfer the update package 230 through a direct communication session with the target embedded device(s) 204 and/or by mapping the respective update package(s) 230 to the memory 206 such that they are accessible to the target embedded device(s) 204 over the communication interconnection.

Optionally, the central dispatch device 202 may transfer a unified update package which includes both the update package 230 and the transient update agent 224. In such case, steps 104, 106 and 108 may be executed as a single step 106. For example, the central dispatch device 202 may transfer the unified update package to a certain embedded device 204 which may store the unified update package in its volatile memory (e.g. RAM) and execute the transient update agent 224 included in the unified update package. The executed transient update agent 224 may access the unified update package to retrieve the update package 230 included in it and apply the update package 230 to the certain embedded device 204.

Since the embedded devices 204 may have limited memory resources, the update package 230 is typically a differential update applied to one or more executable and/or non-executable modules already installed in the respective embedded device 204. This is in contrast to the naïve form of update package of flashing the complete memory image of the respective embedded device 204. The naïve implementation may naturally require extensive memory resources which may not be available in the many of the embedded devices 204. Providing only a differential update may therefore overcome this limitation. Moreover, by providing the differential update, communication resources, for example, bandwidth of the communication interconnection required for transferring the update package 230, update session time and/or the like may be significantly reduced thus releasing the communication interconnection for operational use.

Optionally, the dispatcher 220 communicates simultaneously with multiple target embedded devices 204 to transfer the update package(s) 230 to them. This may be done in case the communication interconnection connecting at least some of the target embedded devices 204 supports multiple simultaneous communication sessions and/or message transmission by the dispatcher 220 to multiple target embedded devices 204. Optionally, simultaneous communication may be conducted in case at least some of the target embedded devices 204 are connected to different (separate) communication ports supported by the communication interface 214 such that the dispatcher 220 may communicate simultaneously with each of the transient update agents 224 executed by the respective embedded device 204 through its independent communication port.

Optionally, one or more of the update packages 230 are encrypted. The update package(s) 230 may be encrypted by one or more of the vendors of the update package(s) 230 and stored in the storage resource(s) 208. Optionally, the dispatcher 220 encrypts the update package(s) 230 before transmitting them to one or more of the embedded devices 204. This may be done to further increase immunity of the embedded device(s) 204 to cyber-attacks of potential malicious attackers, for example, malicious update packages provided by potential attackers that may contain malicious software modules, for example, a virus, a malware and/or the like. The update package(s) 230 may be encrypted using, for example, public/private key encryption algorithms.

After the update packages 230 are transferred (provided) to the target embedded device(s) 204, the target embedded device(s) 204 each executing its respective transient update agent 224 may apply the update package 230 to its respective target embedded device 204. Applying the update package 230 may include, for example, flashing a current memory image installed in the respective target embedded device 204 and/or part thereof, identifying the delta update to the currently installed executable and/or non-executable module(s), copying the executable and/or non-executable module(s) and/or part thereof from a persistent memory to a volatile memory, replacing one or more segments of the currently installed executable and/or non-executable module(s), integrating one or more of the delta update changes with currently installed executable and/or non-executable module(s), copying an updated executable and/or non-executable module(s) and/or part thereof from the volatile memory to the persistent memory and more.

Optionally, after applying the update package 230, the transient update agent 224 is discarded, i.e. removed, deleted and/or removed dumped from the memory of the respective embedded device(s) 204. This may release the memory resources for the embedded device(s) 204 for operational software, data and/or the like for storage and/or for execution.

The process 100 executed may be applied in a plurality of applications, systems and/or platforms.

One example of particular interest is a car. An extremely high number of embedded devices 204, for example, ECU may be deployed in modern cars. The number of ECUs may further increase with the constant evolution of smart cars and/or autonomous cars. Currently, due to the limited memory resources of the ECUs, update agents such as the transient update agent 224 are not available in cars' ECUs thus enhanced update capabilities, for example, differential update, encryption, authentication and more are not supported by the ECUs. However, the ECUs are also constantly evolving and may be deployed with software module(s) providing increased functionality, features and/or capabilities. Such software module(s) may need to be updated during the life time of the ECU after deployed. Applying the architecture of the system 200, a central dispatch device such as the central dispatch device 202 may be deployed in the car.

The central dispatch device 202 may typically include increased execution resources, for example, memory resources as well as network connectivity interfaces for connecting to one or more remote locations, for example, a server, a service, a cloud service and/or the like over one or more networks, for example, a wireless network (e.g. Wi-Fi), a cellular network and/or the like. The ECUs may connect to the central dispatch device 202 through one or more interconnects, for example, a CAN bus.

The central dispatch device 202 may connect to storage resource(s) such as the storage resource(s) 208 either local and/or remote to obtain one or more update packages 230 for one or more of the ECUs. The central dispatch device 202 may then transfer to the target ECUs a transient update agent such as the transient update agent 224 which may be executed by the target ECUs to communicate with the central dispatch device 202 to obtain the update packages 230 and apply them to the respective ECUs.

Once the update session is complete, the ECUs may discard the transient update agent 224 to release their limited resources for execution of their operational software. By temporarily storing and executing the transient update agent 224, the ECUs may take advantage of the enhanced update capabilities available by the transient update agent 224 while operating within their limited execution environment, in particular their limited memory resources.

Another example for using the process 100 may be for updating mobile device type of embedded devices 204, for example, Smartphones. Assuming a large number of Smartphones connect to a central device, for example, a server, a network node and/or the like serving as the central dispatch device 202 through one or more communication infrastructures such as the communication interconnection 240, for example, a cellular link, a Wi-Fi network and/or the like. In some embodiments described herein, the Smartphones may be located at one or more certain geographical location, for example, an organization premises, an institution premises and/or the like in which the central dispatch device 202 is deployed.

While each of the Smartphones may individually communicate with a service provider to obtain its respective update package 230, it may be more efficient to download the update package(s) 230 to the central dispatch device 202 which in turn may provide (transfer) the update package(s) 230 to the Smartphones. Moreover, by first providing the transient update agent 224 to each of the Smartphones, the update session may be significantly improved and/or made more efficient.

For example, assuming a thousand employees of a certain organization each having a Smartphone are located in one or more networked premises of the organization. The central dispatch device 202 communicating with the Smartphones over the local organization network(s), may provide each of the Smartphones with the transient update agent 224, in particular a single version of the transient update agent 224. Each of the Smartphones may then executed the transient update agent 224 which may in turn communicate with the dispatcher 220 executed by the central dispatch device 202 to identify itself and check for the most recent update package available for the respective Smartphone.

The update package may then be downloaded over the local network as a differential update which may optionally be authenticated and/or encrypted thus significantly reducing the network bandwidth required for the updating the software of all the Smartphones. Moreover, since it is highly likely that at least some of the Smartphones may require the same update package 230, the update session may be significantly enhanced to eliminate redundant copies of the same update package 230 to the central dispatch device 202.

It is expected that during the life of a patent maturing from this application many relevant systems, methods and computer programs will be developed and the scope of the terms embedded device and communication interconnection are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments described herein may be presented in a range format. It should be understood that the description in range format is merely for convenience and brevity and should not be construed as an inflexible limitation on the scope of the embodiments described herein. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment described herein may include a plurality of "optional" features unless such features conflict.

It is appreciated that certain features of the embodiments described herein, which are, for clarity, described in the context of separate embodiments, may also be provided in combination in a single embodiment. Conversely, various features of the embodiments described herein, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

Although the embodiments described herein have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the embodiments described herein. To the extent that section headings are used, they should not be construed as necessarily limiting.

What is claimed is:

1. A computer implemented method of updating software of embedded devices of a vehicle connected to a central dispatch device installed in the vehicle via a vehicle bus, comprising:

obtaining from a remote storage via a network an update package for at least one embedded device of the embedded devices, the at least one embedded device is operatively connected to the central dispatch device via a communication interconnection;

initiating an authentication session between the central dispatch device and the at least one embedded device to authenticate the central dispatch device and the at least one embedded device;

authenticating the update package and authenticating a transient update agent, independently from the authentication of the update package, wherein said transient update agent is independent of the update package;

in response to a successful authentication of both the update package and the transient update agent, transferring the transient update agent to the at least one embedded device via the vehicle bus, the at least one embedded device temporarily stores the transient update agent; and after the transferring of the transient update agent to the at least one embedded device and in response to a communication between the central dispatch device and the transient update agent, during the transient update agent being executed by the at least one embedded device, wherein the communication is for downloading the update package, transferring the update package to the at least one embedded device, wherein the transient update agent receives the transferred update package and applies the update package in the at least one embedded device, the at least one embedded device deletes and removes the temporarily stored transient update agent from a memory of the at least one embedded device, after the update package is applied.

2. The computer implemented method of claim 1, wherein a topology of the communication interconnection is a member of a group consisting of the network, a bus, and a point-to-point connection.

3. The computer implemented method of claim 1, wherein the embedded devices connected to the central dispatch device are deployed in the vehicle.

4. The computer implemented method of claim 1, wherein the update package consists of at least one of a full version update and a differential update.

5. The computer implemented method of claim 1, wherein the central dispatch device obtains the update package from a local storage resource attached to at least one Input/Output (I/O) interface of the central dispatch device.

6. The computer implemented method of claim 1, wherein the central dispatch device obtains the update package from another remote storage resource accessible from the central dispatch device through a communication interface isolated from the embedded devices.

7. The computer implemented method of claim 6, the remote storage resource includes a shared repository storing a plurality of update packages for at least some of the embedded devices, each of the plurality of update packages is provided by a respective vendor.

8. The computer implemented method of claim 1, wherein the transient update agent is configured for execution by more than one of the embedded devices.

9. The computer implemented method of claim 1, wherein the transient update agent is locally available in the central dispatch device from a local storage.

10. The computer implemented method of claim 1, wherein the central dispatch device obtains the transient update agent from another remote storage resource accessible from the central dispatch device through a communication interface isolated from the embedded devices.

11. The computer implemented method of claim 1, wherein the transferring comprises mapping at least one of the transient update agent and the update package to a memory resource accessible to the at least one embedded device.

12. The computer implemented method of claim 1, further comprising encrypting at least one of the transient update agent and the update package.

13. A system for updating software of embedded devices of a vehicle which are locally connected to a central dispatch device installed in the vehicle via a vehicle bus, the system comprising the central dispatch device, installed in the vehicle, comprising at least one processor and storing codes, the codes executed by the at least one processor perform operations comprising:
obtaining from a remote storage via a network an update package for at least one embedded device of the embedded devices, the at least one embedded device is operatively connected to the central dispatch device via a communication interconnection;
authenticating independently each of the update package and a transient update agent, wherein said transient update agent is independent of the update package;
transferring the transient update agent to the at least one embedded device via the vehicle bus, in response to a successful authentication of both the update package and the transient update agent, the at least one embedded device temporarily stores the transient update agent; and
transferring the update package to the at least one embedded device after the transferring of the transient update agent and in response to a communication between the central dispatch device and the transient update agent, during the transient update agent being executed by the at least one embedded device, wherein the communication is for downloading the update package, wherein the transient update agent receives the transferred update package and applies the update package in the at least one embedded device, the at least one embedded device deletes and removes the temporarily stored transient update agent from a memory of the at least one embedded device, after the update package is applied.

* * * * *